(12) United States Patent
Siebers et al.

(10) Patent No.: US 8,338,318 B2
(45) Date of Patent: Dec. 25, 2012

(54) GLASS CERAMIC ARMOR MATERIAL

(75) Inventors: Friedrich Siebers, Nierstein (DE);
Hans-Juergen Lemke, Geisenheim (DE); Kurt Schaupert, Hofheim (DE); Thilo Zachau, Bensheim (DE)

(73) Assignee: Schott AG, Mainz (DE)

( * ) Notice: Subject to any disclaimer, the term of this patent is extended or adjusted under 35 U.S.C. 154(b) by 158 days.

(21) Appl. No.: 12/451,794

(22) PCT Filed: May 24, 2008

(86) PCT No.: PCT/EP2008/004155
§ 371 (c)(1),
(2), (4) Date: Jun. 24, 2010

(87) PCT Pub. No.: WO2008/145317
PCT Pub. Date: Dec. 4, 2008

(65) Prior Publication Data
US 2010/0263525 A1    Oct. 21, 2010

(51) Int. Cl.
*C03C 10/14* (2006.01)
*C03C 10/12* (2006.01)

(52) U.S. Cl. ......... 501/4; 501/7; 65/33.7; 65/33.8; 89/36.02

(58) Field of Classification Search ......... 501/4, 7; 89/36.02; 65/33.7, 33.8
See application file for complete search history.

(56) References Cited

U.S. PATENT DOCUMENTS

| | | | |
|---|---|---|---|
| 4,473,653 A | 9/1984 | Rudoi | |
| 5,763,813 A | 6/1998 | Cohen et al. | |
| 6,389,594 B1 | 5/2002 | Yavin | |
| 6,673,729 B2 * | 1/2004 | Siebers et al. | 501/4 |
| 6,846,760 B2 * | 1/2005 | Siebers et al. | 501/32 |
| 7,205,252 B2 * | 4/2007 | Becker et al. | 501/4 |
| 7,875,565 B1 * | 1/2011 | Pinckney et al. | 501/4 |
| 2002/0023463 A1 * | 2/2002 | Siebers et al. | 65/99.5 |
| 2005/0143247 A1 * | 6/2005 | Siebers et al. | 501/4 |
| 2005/0252503 A1 * | 11/2005 | Siebers et al. | 126/1 R |
| 2007/0068375 A1 * | 3/2007 | Jones et al. | 89/36.02 |
| 2007/0232476 A1 * | 10/2007 | Siebers et al. | 501/4 |

FOREIGN PATENT DOCUMENTS

| | | |
|---|---|---|
| DE | 3426457 | 1/1986 |
| DE | 10017701 | 10/2001 |
| DE | 102005019247 | 12/2005 |
| EP | 0390773 | 1/1994 |
| EP | 1146018 | 10/2001 |
| EP | 1170264 | 1/2002 |
| EP | 1291328 | 3/2003 |
| GB | 2284655 A | 6/1995 |
| GB | 228465594 | 6/1995 |
| WO | WO03068501 | 8/2003 |

OTHER PUBLICATIONS

International Search Report and Written Opinion corresponding to International application No. PCT/EP2008/004155 dated May 24, 2008.
Office Action dated Sep. 15, 2011 corresponding to German Patent Application No. 102007025893.5.
English translation of International Preliminary Report dated Dec. 10, 2009 for corresponding International Application No. PCT/EP2008/004155.

* cited by examiner

*Primary Examiner* — Karl Group
(74) *Attorney, Agent, or Firm* — Ohlandt, Greeley, Ruggiero & Perle, LLP

(57) ABSTRACT

Antiballistic armor is provided that includes a glass-ceramic component having 50 to 70 weight percent $SiO_2$, 15 to 25 weight percent $Al_2O_3$, 0.5 to 5 weight percent $ZrO_2$, 0.1 to 10 weight percent $Li_2O$, 1 to 5 weight percent $TiO_2$. The glass ceramic component has a main crystalline phase that comprises keatite mixed crystal in a compositional range of $LiAlSi_2O_6$ to $LiAlSi_4O_{10}$.

19 Claims, 2 Drawing Sheets

Figure 3:
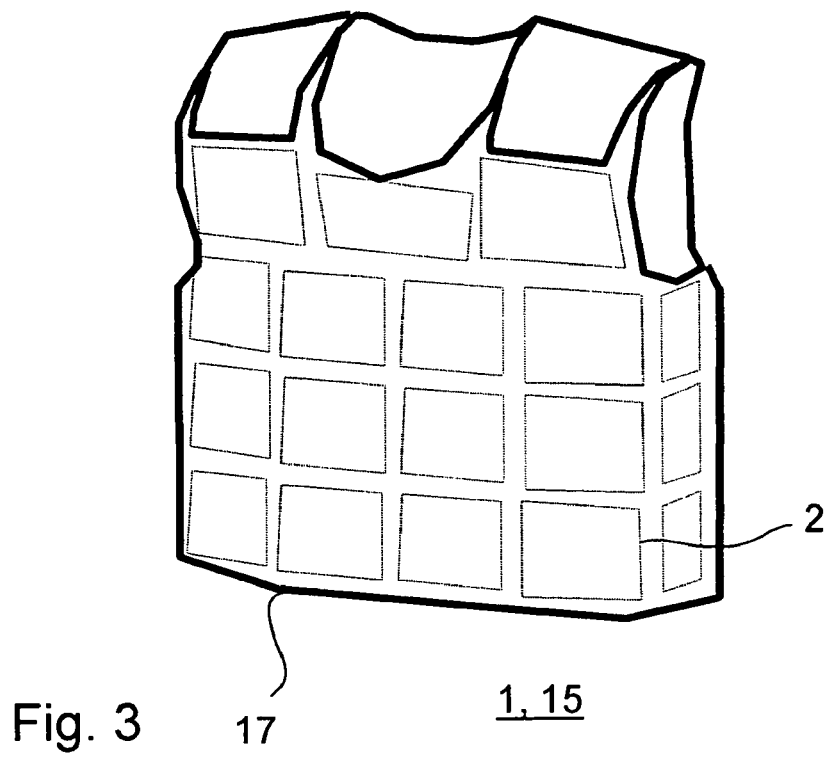

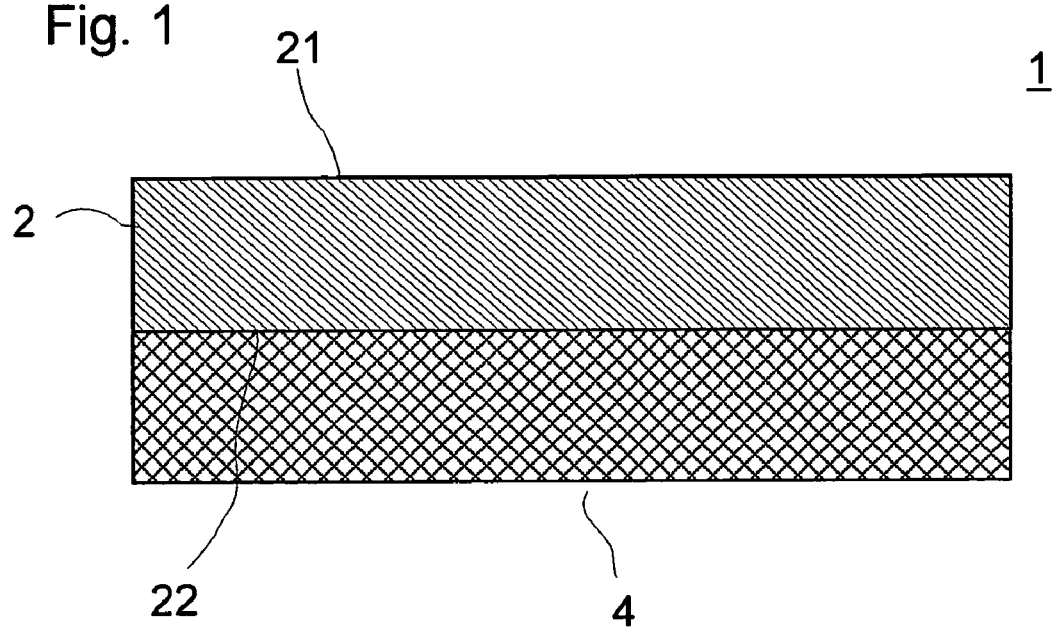
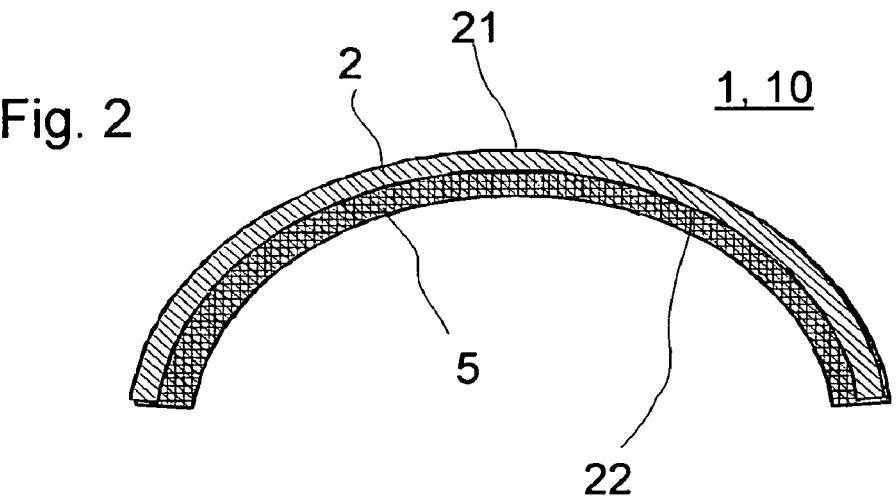

GLASS CERAMIC ARMOR MATERIAL

The invention relates generally to armors, in particular armors against high-dynamic impulse loads based on glass ceramic materials.

A protection against projectiles resulting from bombardment or the effect of fragmentation can be effected by metal or ceramic working materials. The form, structure, and kinetic energy of the projectiles, against which protection is to be afforded, are governed in this case by the choice of protective materials. Armors are often constructed as a layer composite consisting of a hard material and a support or backing. In this case, ceramic components are often backed with fiber composites in order to destroy the projectile by means of the ceramic material or at least to deform it and to trap the projectile parts or ceramic splinters, which may form due to the interaction between the projectile and the armoring material, by means of the fiber composite.

Used as backings are, for example, aramid fiber fabrics, steel mesh, or even steel plates. Such armors serve, for example, for personal protection, for instance for a bulletproof vest or for protection of objects, such as motorized vehicles and aircraft.

In all these areas of use, it is essential that the armors have high strength yet not be too heavy.

In the case of the ceramic materials commonly used for antiballistic armors or armors against high-dynamic impulse loads, which occur during the impact of projectiles, there exists the problem that, in general, the ceramic still has a certain porosity or knots or other inhomogeneities. The inhomogeneities in this case can represent weak points, which promote the propagation of cracks when a projectile impacts.

In particular, in the case of ceramic composite materials, there further ensues the problem that the ceramic matrix often does not surround perfectly the other phase, such as, for instance, embedded fibers, because the ceramic material cannot flow during sintering. Especially in the case of ceramic materials, therefore, increased porosities and knot inclusions can occur. In addition, many ceramic materials that are suitable for armors have a high specific gravity. Thus, the density of aluminum oxide ceramics is about 4 g/cm$^3$.

Known from U.S. Pat. No. 4,473,653 A is an armor containing a lithium aluminosilicate glass ceramic and the manufacture thereof. Further known is the protection of aircraft, such as, for instance, helicopters, by means of boron carbide-containing armors. Used in general for this purpose is a ceramic that contains aluminum oxide($Al_2O_3$), silicon carbide (SiC), boron carbide($B_4C$), and titanium boride ($TiB_2$). Although these materials are relatively light, they are also very expensive on account of their complex manufacture. Armors made of ceramic composite material are additionally known from U.S. Pat. No. 5,763,813 A.

In all applications, a low weight per unit area, that is, a low mass of armoring per projectile-impeding protected area is a target quantity for a specific protective effect. The greatest possible protection is to be achieved with the smallest possible mass, because the vehicle or person to be protected has to carry this weight in addition to other gear. Therefore, according to the prior art, in the case of applications in which no transparency is required, armoring components made of steel are replaced by those made of ceramic polymer fiber composites. Among others, ceramics based on aluminum oxide, silicon carbide, or boron carbide are used as the ceramics.

Known from EP 0390773 B1 is a protective device consisting of a laminate made of glass ceramic with an energy-absorbing back-side coating, the glass ceramic having a substantially lower hardness than that of aluminum oxide. The protective device in this case suffers a multiple fracture on impact of a projectile. The glass ceramic is produced by controlled crystallization of a starting glass by means of thermal treatment. Mentioned are examples of starting glasses from different glass-ceramic base systems. The structural change brought about during the thermal treatment is meant to take place such that, at a crystal center formation temperature, crystal centers or seeds are separated out, to which, at a temperature below the maximum rate of crystal formation, a high density of fine-grained crystals forms, which is greater than the fine-grained crystal density that would form at the maximum rate of crystal formation. The base glass of $Li_2O$—$Al_2O_3$—$SiO_2$ glass ceramic, described as Example 2, is ceramicized in such a way that a high-quartz mixed-crystal glass ceramic is formed. The action of a projectile will produce a conical fracture structure. A problem in this case lies, as also in the case of other hard materials, in the fact that, although these materials are well able to break the force of a single projectile repeatedly, they are often splintered in such a manner that they do not offer any effective protection against repeated bombardment.

For applications in which transparency is required, laminates made of glass and plastic and, in part, also single-crystalline or transparent ceramic materials are employed. A problem in this case consists in the fact that these transparent armor materials are only poorly effective. In order to ensure an effective protection, however, these armor materials must be very thick. The latter associated with, among other things, weight problems.

Besides the protection against a penetrating projectile, the aim of a protective device is also to protect against other projectiles possibly acting at intervals in time in the near vicinity of the first projectile (multiple bombardment). Ceramics or glass ceramics according to the prior art generally have a fracture behavior that brings about a large-area fracture pattern and small-piece splintering. Therefore, a segmentation of ceramic components is provided, such as described in DE 3426457 by way of example. However, such a segmentation leads to weak points in the edge region of the individual segments and to increased processing expenditure.

Alternatively, U.S. Pat. No. 6,389,594 proposes to furnish the ceramic component with a compressive pretensioning by means of an outer shell. The protective effect of a protective device depends on a uniform quality of the material without inner and outer defect sites. An inspection of ceramic components for internal defect sites is made difficult in many cases by the fact that the material is not optically transparent.

In many cases, glass ceramic has the advantage over this that the starting glass is transparent prior to the thermal treatment and can therefore be readily examined optically for defect sites (air bubbles, schlieren, inclusions, scratches). Furthermore, glass ceramic is a material that, as a result of the manufacturing process, does not have any porosity, whereas ceramic is manufactured from particles by a sintering procedure and always has a residual porosity. Complex process steps, such as, for example, an infiltration with fused glass, are necessary to close up this residual porosity.

The problem of the invention is to create a glass-ceramic component for a protective device against ballistic influences, which is easy to manufacture and yet brings about an improved protective effect against multiple bombardment.

This problem is solved by the subject of the independent claims. Advantageous embodiments and enhancements of the invention are presented in the respective dependent claims.

Surprisingly, it was found that this problem is solved in that the glass-ceramic component is obtained from a starting glass that contains the following components:
50 to 70 weight percent $SiO_2$,
15 to 25 weight percent $Al_2O_3$,
0.5 to 5 weight percent $ZrO_2$,
0.1 to 10 weight percent $Li_2O$,
1 to 5 weight percent $TiO_2$. Obviously, the glass ceramic also contains these components.

Preferably, furthermore, one or more of the components BaO, CaO, $K_2O$, MgO, $Na_2O$, $P_2O_5$, $SnO_2$, $As_2O_3$, $Sb_2O_3$, $V_2O_5$, CoO, NiO, $Fe_2O_3$, each between 0 and 5 weight percent, is contained as additive.

For the production of the glass-ceramic component according to the invention, the starting glass is subjected to a thermal treatment at temperatures above the temperature of the maximum rate of deposition of the high-quartz mixed crystal, with, as a constituent of the main crystalline phase of the glass ceramic, keatite mixed crystal or spodumene in the compositional region $LiAlSi_2O_6$—$LiAlSi_4O_{10}$ being produced.

Preferably, the keatite mixed crystal phase constitutes the predominant volume percent of the crystalline phase or of the crystallized volume and/or of the total volume. In this case, it is particularly preferred when the keatite mixed crystal phase is deposited with a proportion of between 60 and 98 volume percent.

On account of its low weight, antiballistic armor containing a glass-ceramic component according to the invention is especially suited as portable personal protection gear. Conceived of here are, among other things, vests as well as also devices, such as visors or shields, for which transparency is desired or required.

Transparency of a glass-ceramic component according to the invention can be achieved by limiting the mean crystallite size by variation of the temperature-time regimen during the ceramicization to less than 0.2 micrometer, preferably less than 0.1 micrometer. The composition of the glass ceramic or of the starting glass is preferably chosen such that the refractive index of the residual glass phase deviates from the refractive index of the crystalline phase only by less than ±0.3. As a result, the reduction in transmission due to light scattering/haze is sufficiently small, so that the material is adequate as a transparent protective material for practical applications.

In particular, the glass ceramic can have a structure that is transparent according to the Andrejev-Hopper model. According to this model, the haze $\sigma_c$ due to scattering is calculated according to the following equation:

$$\sigma_c = 2/3 k^4 \theta^3 (n \cdot \Delta n)^2$$

In this equation, n stands for the crystallite refractive index and Δn stands for the refractive index difference of the crystallite in relation to the residual glass phase. The parameter k is given by $k=2\pi/\lambda$, where λ is the wavelength of the light being observed. The parameter θ stands for the mean phase separation of the phases involved, namely, the residual glass phase and the crystallite, and is given by:

$$\theta = (a+W/2) \cdot 10^{-3}$$

Here, a stands for the crystallite radius and W the crystallite separation. A sufficiently small scattering to make the glass ceramic transparent is achieved, in particular, with a mean crystal radius of less than 15 nm and a refractive index difference Δn of less than 0.3.

In an advantageous enhancement, the glass ceramic can also be manufactured to be transparent according to the Rayleigh-Gans model by suitably choosing the starting glass and the temperature control during the ceramicization. According to this model, the following is valid for the haze $\sigma_p$ due to scattering:

$$\sigma_p = 2/3 N \cdot V \cdot k^4 \cdot a^3 \cdot (n \cdot \Delta n)^2$$

Here, V stands for the crystallite volume and N the crystallite density. The other symbols stand for the same parameters as in the equation for haze according to the Andreev-Hopper model. According to the Rayleigh-Gans model, sufficiently low haze or sufficient transparency is reached for a mean crystallite radius a of less than 30 nm and a refractive index difference Δn of the crystallites relative to the residual glass phase of Δn<0.1. It is found that such a glass ceramic is not only transparent, but also fulfills the strength requirements under bombardment.

The transparency is an advantageous property also for applications in which transparency is not required in itself, such as, for example, for bulletproof vests that are armored with glass-ceramic components according to the invention. The transparency of the material according to the invention makes it possible to examine the glass ceramic for possible defects that are present in the bulk volume and possibly reduce strength, such as larger bubbles or inclusions, and to sort out defective components.

It is further particularly appropriate to use plate-shaped glass-ceramic components, so that one of the sides of the plate offers a large-area protection against projectiles. However, the plate need not be flat. Thus, besides flat plates, curved plates or plates having a structured surface can also be manufactured. As governed by the manufacturing process, there are available, in general, essentially the same forming possibilities as for the manufacture of glass panes.

In order to improve the ballistic strength of an antiballistic armor according to the invention, which has one of the glass-ceramic components described above, it is further advantageous to employ the glass-ceramic component in combination with one or more other components. A particularly bulletproof arrangement is achieved by means of a composite with another armor element, for example by means of a laminate of the glass-ceramic component with a fiber-reinforced polymer. For bulletproof glazings, such as, for instance, a visor or protective glass for an armored vehicle, for example, it is also possible to use a composite with a transparent plastic plate or film, such as, for example, one made of polycarbonate, as armor. Both for the use as a visor and for the use as a protective glass, the glass ceramic can be formed in the shape of a flat or curved plate depending on application.

Figure 4:
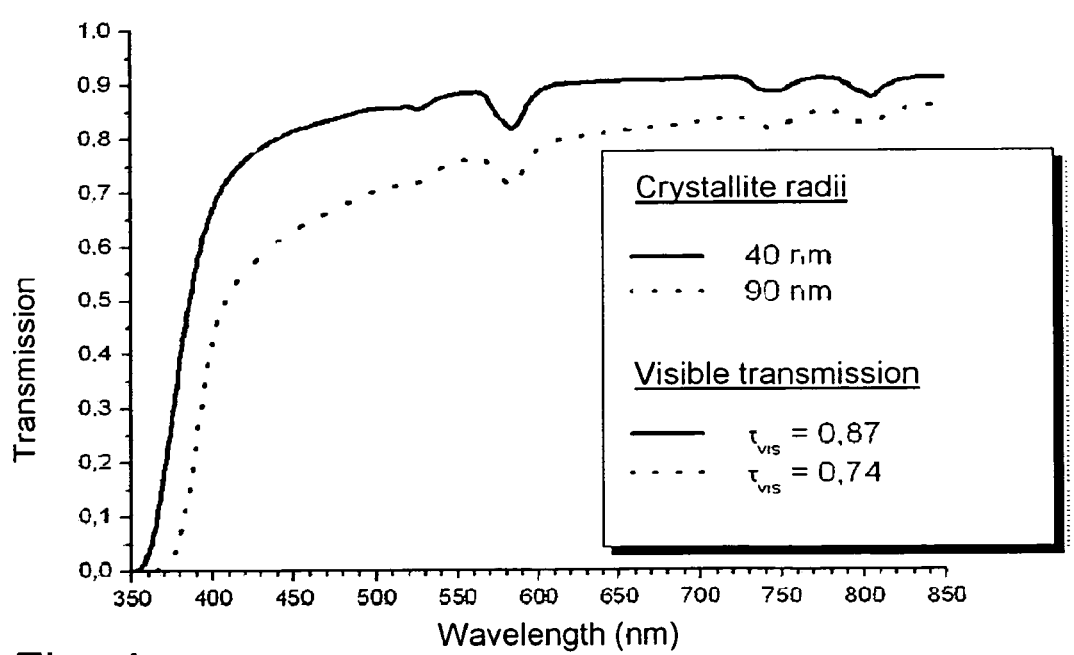

The invention will be described in more detail below on the basis of exemplary embodiments and with reference to the attached figures. In the figures, the same reference numerals stand for the same or corresponding elements. Shown are:

FIG. 1 a laminate of a glass-ceramic component with a fiber-reinforced plastic plate, FIG. 2 a visor with a curved glass-ceramic component, FIG. 3 a bulletproof vest with glass-ceramic armoring, and FIG. 4 a diagram of transmission as a function of wavelength for glass ceramics having two different crystallite sizes.

FIG. 1 shows, in schematic cross section, an armor 1. The armor 1 comprises a glass-ceramic component according to the invention in the shape of a plate 2 with sides 21, 22. The plate 2 is laminated with its side 22 onto a fiber-reinforced plastic plate 4. The glass ceramic of the plate 2 is a lithium aluminosilicate glass ceramic, which contains 50 to 70 weight percent $SiO_2$, 15 to 25 weight percent $Al_2O_3$, 0.5 to 5 weight percent $ZrO_2$, 0.1 to 10 weight percent $Li_2O$, 1 to 5 weight percent $TiO_2$, as well as one or more of the additional constituents BaO, CaO, $K_2O$, MgO, $Na_2O$, $P_2O_5$, $SnO_2$, $As_2O_3$, $Sb_2O_3$, $V_2O_5$, CoO, NiO, $Fe_2O_3$, each between 0 and 5 weight percent.

Depending on the intended use, one of the sides 21, 22 constitutes the side exposed to a projectile. It is particularly preferred to insert the armor or to install it in such a way that the side 21 constitutes the exposed side. In other words, it is generally advantageous, without limitation to the example shown in FIG. 1, when, in the case of a composite with an additional softer armor element, the glass-ceramic component is arranged in the direction of action in front of the additional armor element. This is of advantage because, due to its hardness, the glass ceramic acts strongly to destroy projectiles. Any remaining projectile parts or splinters can be easily trapped by the softer material lying behind it. However, obviously, in this case, it cannot be excluded that one or more additional armor elements are arranged also in the direction of action in front of the glass ceramic.

Described below is an exemplary embodiment in which the ballistic strength of a piece of armor, as illustrated in FIG. 1, is tested and compared to other materials. A plate-shaped glass-ceramic component according to the invention, having the main crystalline phase keatite mixed crystal in the laminate with a fiber-reinforced polymer, as a protective device, was tested in comparison to other components of the same chemical composition. The test was conducted by bombardment with a hard-core projectile of caliber 7.65 with a velocity of impact of 835 m/s.

For comparison, a glass ceramic having the main crystalline phase high-quartz mixed crystal in the laminate with a fiber-reinforced polymer component was tested in terms of its ballistic protective effect. In addition, a similar laminate with a fiber-reinforced polymer component and a glass component with a glass of the same composition were examined.

Both for the glass component and also for the glass-ceramic component with high-quartz mixed crystal as main crystalline phase, an impacting projectile led to a finely crumbled destruction with a diameter of 8 cm and a destroyed zone surrounding it. Found in this zone with a diameter of 28 cm are numerous radial cracks originating in a starlike pattern from the site of impact of the projectile.

The glass ceramic according to the invention has a proportion of 85 volume percent of keatite mixed crystal. In the case of this glass ceramic, the fracture pattern was finely crumbled only in a zone of 4-cm diameter. Regions outside of this zone were only criss-crossed by individual cracks. Therefore, the protective effect is largely preserved unchanged.

Accordingly, by means of the component according to the invention, the protective effect against multiple bombardment is strongly improved. The large-area destroyed zone that otherwise occurs in the case of other glass ceramics or glasses directly leads to the fact that, within this zone, another projectile still encounters only smaller shards. However, these shards offer only inadequate protection, in particular when the shards are smaller than the finely crumbled destroyed zone. In this case, even in the most favorable case, a bull's-eye impact on a shard, the energy of the bullet can no longer be absorbed to the same extent by pulverization of the armor material.

FIG. 2 shows another exemplary embodiment, which exploits in a particularly advantageous manner the transparency of the glass ceramic according to the invention. FIG. 2 shows, in particular, an armor 1 in the form of a visor 10. The visor 10 comprises a glass ceramic component in the shape of a curved plate. This plate is bonded to a transparent plastic plate 5.

The plastic plate 5 also has a function as an armor element. Just like the fiber-reinforced plastic plate 4 in the example shown in FIG. 1, the plastic plate 5 prevents the penetration of splinters of the glass ceramic plate 2 and/or of an impacting projectile. Just as for the example shown in FIG. 1, therefore, the plastic plate 5 is arranged in the direction of action behind the glass ceramic plate 2. In addition, just as on the basis of the example described in FIG. 1, the release of splinters of the bombarded glass ceramic material is prevented and the glass ceramic material is held together, even after a bombardment, by the composite partner.

Illustrated in FIG. 3 is an example of an armor 1 in the form of a bulletproof vest 15. The textile material 17 of the vest 15 serves as a backing for plates 2 of the glass-ceramic material, which, for example, can be sewn in between two layers of textile. The sewn-in plates of the glass-ceramic material, which are not visible from the outside, are illustrated in FIG. 3 as dashed lines. Coming into consideration as textile backing material are, for example, once again aramid fabric or uHDPE (ultrahigh-density polyethylene) fabric. The plates can also be employed in the vest in the form of a laminate with a fiber-reinforced plastic or a plastic plate, such as in the examples shown in FIGS. 1 and 2.

FIG. 4 shows a diagram of spectral transmission as a function of wavelength for two keatite glass ceramics in accordance with the invention, which have different crystallite sizes. The mean crystallite radii of the glass ceramics are 40 nanometers in the first example and 90 nanometers in the second example. Involved in the case of both examples is the same base material, for which, by means of different process parameters during the ceramicization, the different mean crystallite radii of the keatite mixed crystal were produced.

It can be seen on the basis of the two spectral transmission curves that the transmission decreases with increasing crystallite radius due to scattering. Also determined from the curves for the two glass ceramics was the transmission in the visible region, $\tau_{vis}$. This is 0.74 for the glass ceramic with a mean crystallite radius of 90 nanometers and 0.87 for the glass ceramic with a mean crystallite radius of 40 nanometers. The transmission in the visible region, $\tau_{vis}$, can be found by determining the spectral transmission in the range of 380 to 780 nanometers at intervals of 5 nanometers, convoluting with the eye sensitivity, and summing.

Without limitation to the preceding examples, in accordance with an enhancement of a glass ceramic according to the invention, it is possible to characterize the latter also such that the mean crystallite radius of the keatite mixed crystal is at most 100 nanometers and the transmission in the visible region is at least 0.7 and/or the mean crystallite radius of the keatite mixed crystal is at most 50 nanometers and the transmission in the visible region is at least 0.8.

It is obvious to the person skilled in the art that the invention is not limited to the exemplary embodiments described above, but can be varied in diverse ways. In particular, the features of the individual exemplary embodiments can also be combined with one another.

The invention claimed is:

1. Antiballistic armor comprising:
   a transparent glass-ceramic component, the glass-ceramic component comprising
   50 to 70 weight percent $SiO_2$,
   15 to 25 weight percent $Al_2O_3$,
   0.5 to 5 weight percent $ZrO_2$,
   0.1 to 10 weight percent $Li_2O$, and
   1 to 5 weight percent $TiO_2$, wherein the transparent glass ceramic component has a main crystalline phase that comprises keatite mixed crystal having a composition of $LiAlSi_xO_y$, wherein x is in a range of 2 to 4 and y is in a range of 6 to 10, and wherein the transparent glass ceramic component has a mean crystallite size of less than 0.1 micrometers.

2. The antiballistic armor according to claim 1, wherein the glass ceramic component comprises the keatite mixed crystal in a proportion of 60 to 98 volume percent.

3. The antiballistic armor according to claim 1, wherein the glass ceramic component further comprises a component selected from the group consisting of BaO, CaO, $K_2O$, MgO, $Na_2O$, $P_2O_5$, $SnO_2$, $As_2O_3$, $Sb_2O_3$, $V_2O_5$, CoO, NiO, $Fe_2O_3$, and any combinations thereof.

4. The antiballistic armor according to claim 3, wherein the component is present in an amount of greater than 0 weight percent and up to 5 weight percent.

5. The antiballistic armor according to claim 1, wherein the glass ceramic component comprises crystallites having a mean crystallite radius of less than 30 nanometers and a refractive index difference in relation to a residual glass phase of less than 0.3.

6. The antiballistic armor according to claim 1, wherein the keatite mixed crystals have a mean crystallite radius that is at most 100 nanometers and a transmission in a visible region of at least 0.7.

7. The antiballistic armor according to claim 1, wherein the keatite mixed crystals have a mean crystallite radius that is at most 50 nanometers and a transmission in a visible region of at least 0.8.

8. The antiballistic armor according to claim 1, wherein the glass-ceramic component is configured for use as a portable personal protection device, a glazing, a visor, or a protective glass.

9. The antiballistic armor according to claim 1, further comprising an additional armor element that is softer than the glass-ceramic component, the glass-ceramic component being arranged in front of, in a direction of action, the additional armor element.

10. A method for producing transparent antiballistic armor, comprising:
providing a starting glass for a glass-ceramic component, the starting glass comprising 50 to 70 weight percent $SiO_2$, 15 to 25 weight percent $Al_2O_3$, 0.5 to 5 weight percent $ZrO_2$, 0.1 to 10 weight percent $Li_2O$, and 1 to 5 weight percent $TiO_2$;
subjecting the starting glass to a thermal treatment at temperatures above a temperature of a maximum rate of deposition of a high-quartz mixed crystal;
depositing keatite mixed crystal in a composition of $LiAlSi_xO_y$, wherein x is in a range of 2 to 4 and y is in a range of 6 to 10; and
limiting a mean crystallite size by variation of a temperature-time regimen during ceramicization to less than 0.1 micrometer to produce the transparent antiballistic armor.

11. The method according to claim 10, further comprising depositing the keatite mixed crystal with a proportion of between 60 and 98 volume percent.

12. The method according to claim 10, wherein the starting glass further comprises a component selected from the group consisting of BaO, CaO, $K_2O$, MgO, $Na_2O$, $P_2O_5$, $SnO_2$, $As_2O_3$, $Sb_2O_3$, $V_2O_5$, CoO, NiO, $Fe_2O_3$, and any combinations thereof.

13. The method according to claim 10, further comprising selecting the starting glass such that a refractive index of a residual glass phase deviates by less than ±0.3 from a refractive index of a crystalline phase.

14. The method according to claim 10, further comprising selecting the starting glass and controlling a temperature during ceramicization such that crystallites a provided having a mean crystallite radius of less than 100 nm and a refractive index difference in relation to the residual glass phase of less than 0.1.

15. The method according to claim 10, further comprising forming a composite of the keatite mixed crystal with a fiber-reinforced polymer and/or a transparent plastic plate or film.

16. The antiballistic armor according to claim 1, wherein the glass-ceramic component has a transmission in the visible region that is at least 0.8.

17. The antiballistic armor according to claim 1, wherein the glass-ceramic component has a transmission in the visible region that is at least 0.7.

18. The method according to claim 10, wherein the transparent antiballistic armor has a transmission in the visible region that is at least 0.8.

19. The method according to claim 10, wherein the transparent antiballistic armor has a transmission in the visible region that is at least 0.7.

* * * * *